(12) United States Patent
Stiig et al.

(10) Patent No.: US 7,364,399 B2
(45) Date of Patent: Apr. 29, 2008

(54) WIND POWER PLANT OF CYCLONE TYPE AND METHOD OF OBTAINING ENERGY FROM SUCH

(75) Inventors: Eric Stiig, Umeå (SE); Mohammad R. Golriz, Nepean (CA)

(73) Assignee: Karin Oldin, Umea (SE)

(*) Notice: Subject to any disclaimer, the term of this patent is extended or adjusted under 35 U.S.C. 154(b) by 0 days.

(21) Appl. No.: 10/554,351

(22) PCT Filed: Apr. 29, 2004

(86) PCT No.: PCT/SE2004/000664

§ 371 (c)(1),
(2), (4) Date: Nov. 17, 2006

(87) PCT Pub. No.: WO2004/097216

PCT Pub. Date: Nov. 11, 2004

(65) Prior Publication Data

US 2007/0140830 A1     Jun. 21, 2007

(30) Foreign Application Priority Data

Apr. 30, 2003   (SE) .................................. 0301267

(51) Int. Cl.
*F03D 3/04* (2006.01)
(52) U.S. Cl. .................... 415/1; 415/4.2; 415/4.3; 415/4.4; 415/4.5; 415/123
(58) Field of Classification Search .............. 415/1, 415/2.1, 4.1, 4.2, 4.3, 4.4, 4.5, 123, 905, 415/907–909; 416/169 R; 290/44, 55
See application file for complete search history.

(56) References Cited

U.S. PATENT DOCUMENTS

| | | | | |
|---|---|---|---|---|
| 4,018,543 A | * | 4/1977 | Carson et al. | 415/208.2 |
| 4,070,131 A | | 1/1978 | Yen | |
| 4,433,544 A | * | 2/1984 | Wells et al. | 60/641.12 |
| 4,452,562 A | * | 6/1984 | Hsu | 415/208.1 |
| 4,508,973 A | * | 4/1985 | Payne | 290/55 |
| 4,935,639 A | * | 6/1990 | Yeh | 290/55 |
| 5,852,331 A | * | 12/1998 | Giorgini | 290/55 |

FOREIGN PATENT DOCUMENTS

| | | | |
|---|---|---|---|
| DE | 4122667 A1 | 1/1993 | |
| EP | 0097635 A2 | 1/1984 | |
| FR | 1086320 A | 2/1955 | |
| FR | 2588317 A1 | 4/1987 | |
| JP | 57-129274 A * | 8/1982 | 415/4.5 |

* cited by examiner

*Primary Examiner*—Christopher Verdier
(74) *Attorney, Agent, or Firm*—Holland & Bonzagni, P.C.; Mary R. Bonzagni, Esq.

(57) ABSTRACT

A wind power plant having a tower open at the top and provided with a side inlet for the wind for generating a cyclone in the tower and a substantially horizontal turbine that has inlets through the base and an outlet to the center of the cyclone in the tower and that is driving a generator. The tower is rotatable and has a non-circular elliptical shape viewed in the horizontal plane. This shape increases the power of the wind power plant as compared to a tower with a circular shape. During operation, the tower is turned so that the wind inlet is always facing the wind.

10 Claims, 4 Drawing Sheets

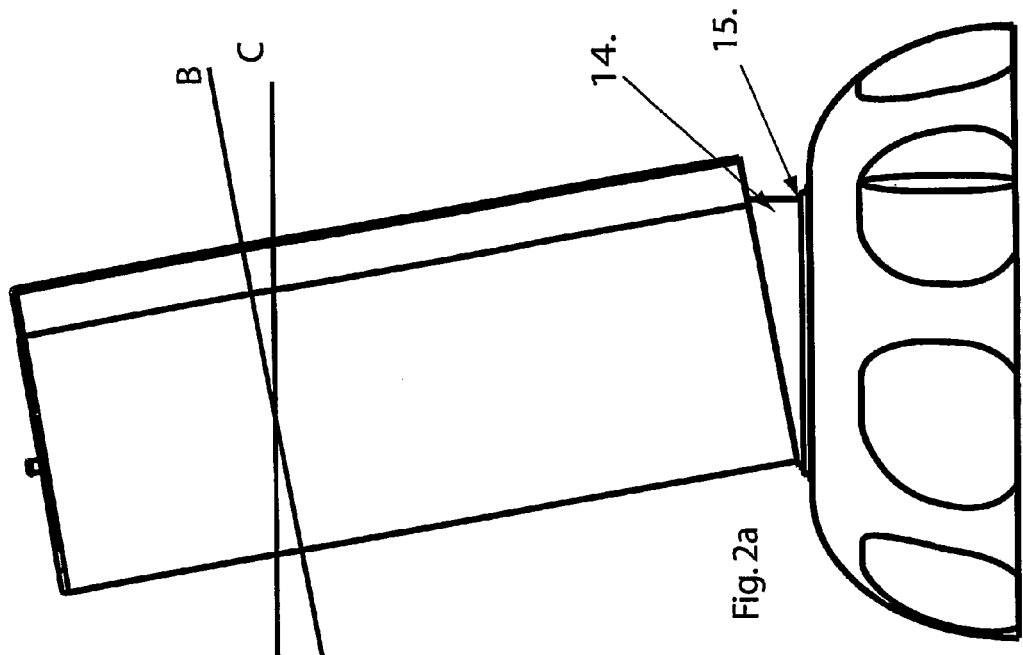
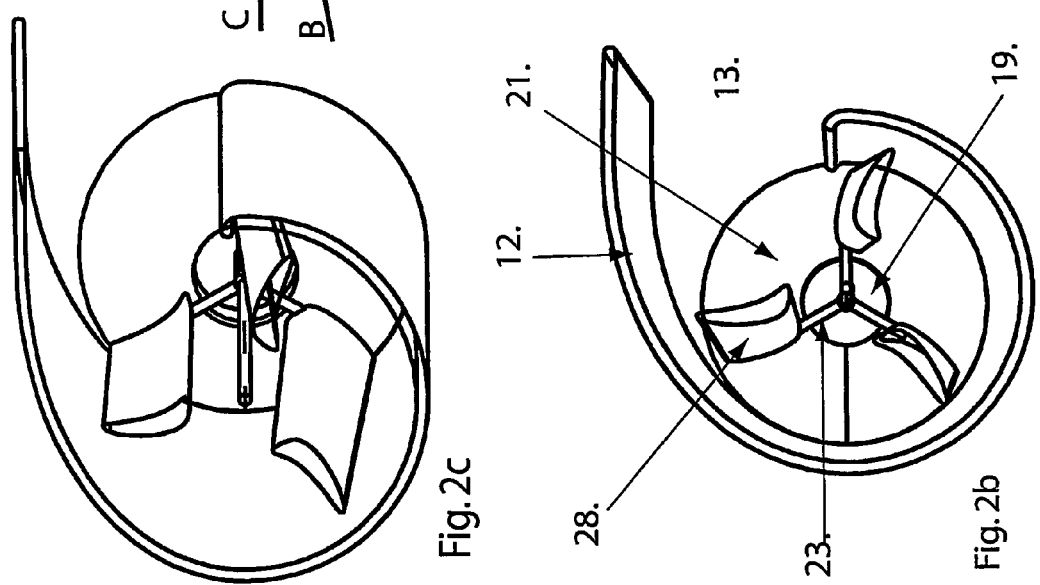
Fig. 2a
Fig. 2b
Fig. 2c

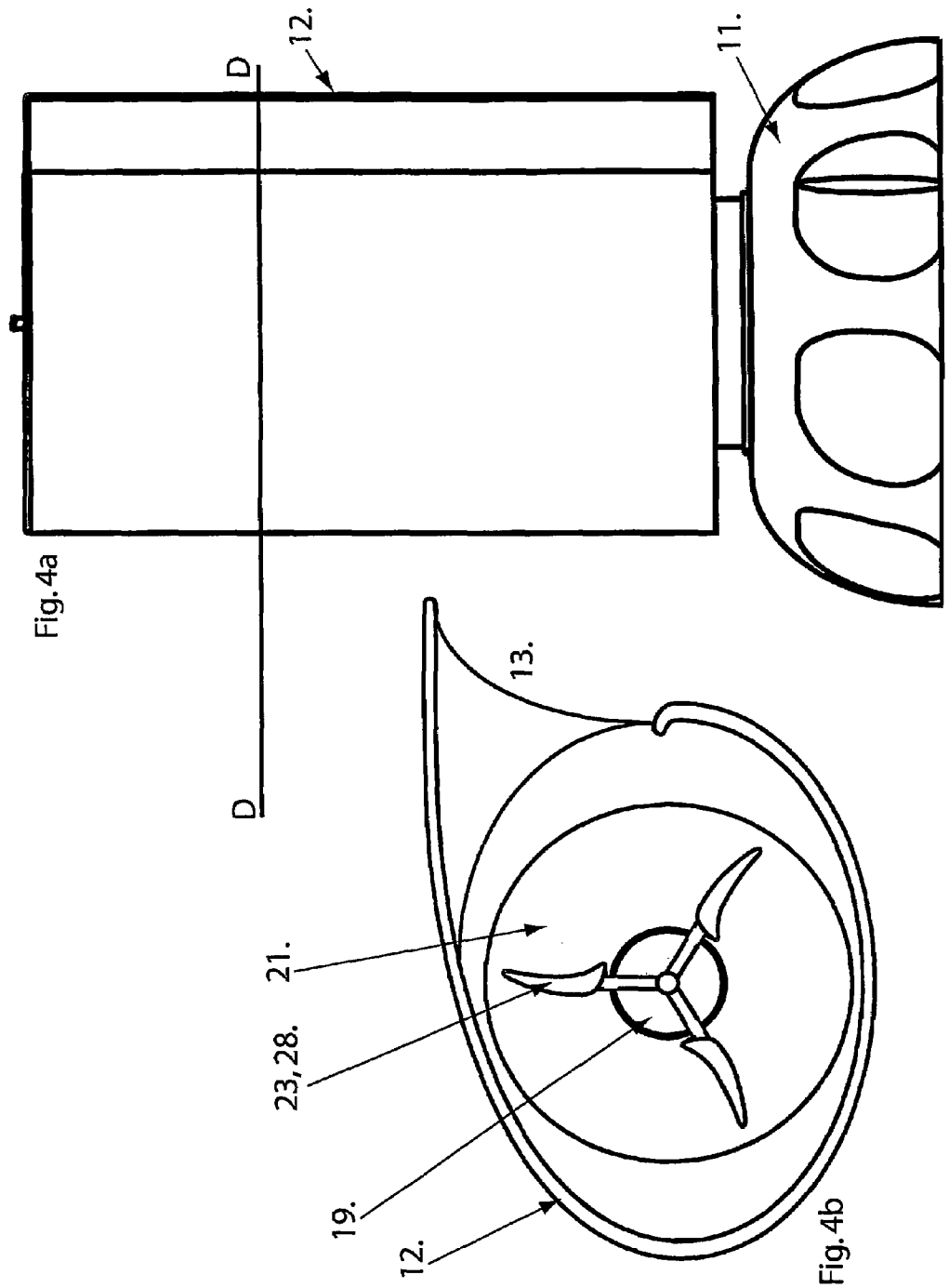

WIND POWER PLANT OF CYCLONE TYPE AND METHOD OF OBTAINING ENERGY FROM SUCH

TECHNICAL FIELD OF THE INVENTION

The present invention relates to a method of obtaining energy from a wind power plant comprising a tower with a generator-driving turbine, the axis of which is parallel and coaxial to the tower, whereby a cyclone is generated in the open-ended tower with a side inlet for the wind, so that the low-pressure region in the center of the cyclone generates the driving power for the air flow through the turbine.

The invention also relates to a wind power plant of cyclone type comprising a base, an open-ended tower arranged above the base and being provided with a side inlet for the wind to generate a cyclone in the tower, a turbine having its axis parallel to the tower and inlet(s) through the base and outlet(s) to the center of the cyclone in the tower and being connected to drive a generator arranged in the base.

BRIEF DESCRIPTION OF THE PRIOR ART

A wind power plant of the above-mentioned type is known from U.S. Pat. No. 4,935,639 A, where it is presented as previously known technology. Around the periphery of the entire tower there are vertical plates defining side inlets for the wind. The plates give rise to a disturbance in the airflow by causing turbulence. It is evident from the document that limited power is obtained by means of this device and the document proposes to modify this known technology in order to increase the output power. A very complicated and expensive device is proposed.

BRIEF DESCRIPTION OF THE INVENTION AND ITS PURPOSE

A purpose of the invention is to improve the power-generation of wind power plants of the mentioned kind in a way that results in a low investment cost as well as high reliability and low costs of maintenance.

This objective is achieved by means of a method and a device according to the appended independent claims.

By rotating the tower during operation in order to keep the wind inlet towards the wind, a wind inlet that provides a completely laminar flow can be attained.

By designing the tower to have a non-circular elliptical shape with the large axis of the ellipse arranged to be parallel to the direction of the incoming wind as viewed in a horizontal plane, the power-extraction is increased. This is due to the fact that the laminar flow changes direction and speed several times for each rotation of its whirlwind movement and each retardation and acceleration results in kinetic energy being transformed into heat energy whereby the rise velocity in the tower is increased. A thermal formation is achieved in a very simple and efficient manner.

In addition to a vertical tower presenting a non-circular elliptical cross section, the elliptical shape in the horizontal plane can be obtained using a tower with a circular cross section, which leans with respect to the vertical at an angle that preferably is 10-30 degrees. The leaning is then preferably away from the wind or directly towards the wind.

BRIEF DESCRIPTION OF THE DRAWINGS ILLUSTRATING TWO EXEMPLARY EMBODIMENTS

FIG. 2a is a side view of the wind power plant according to FIG. 1;

FIG. 2b is a section on line B-B in FIG. 2a;

FIG. 2c is a section on line C-C in FIG. 2a;

FIG. 4a is a side view of an alternative embodiment of a wind power plant according to the invention; and FIG. 4b is a section on line D-D in FIG. 4a.

DETAILED DESCRIPTION OF PREFERRED EMBODIMENTS

Figure 1:
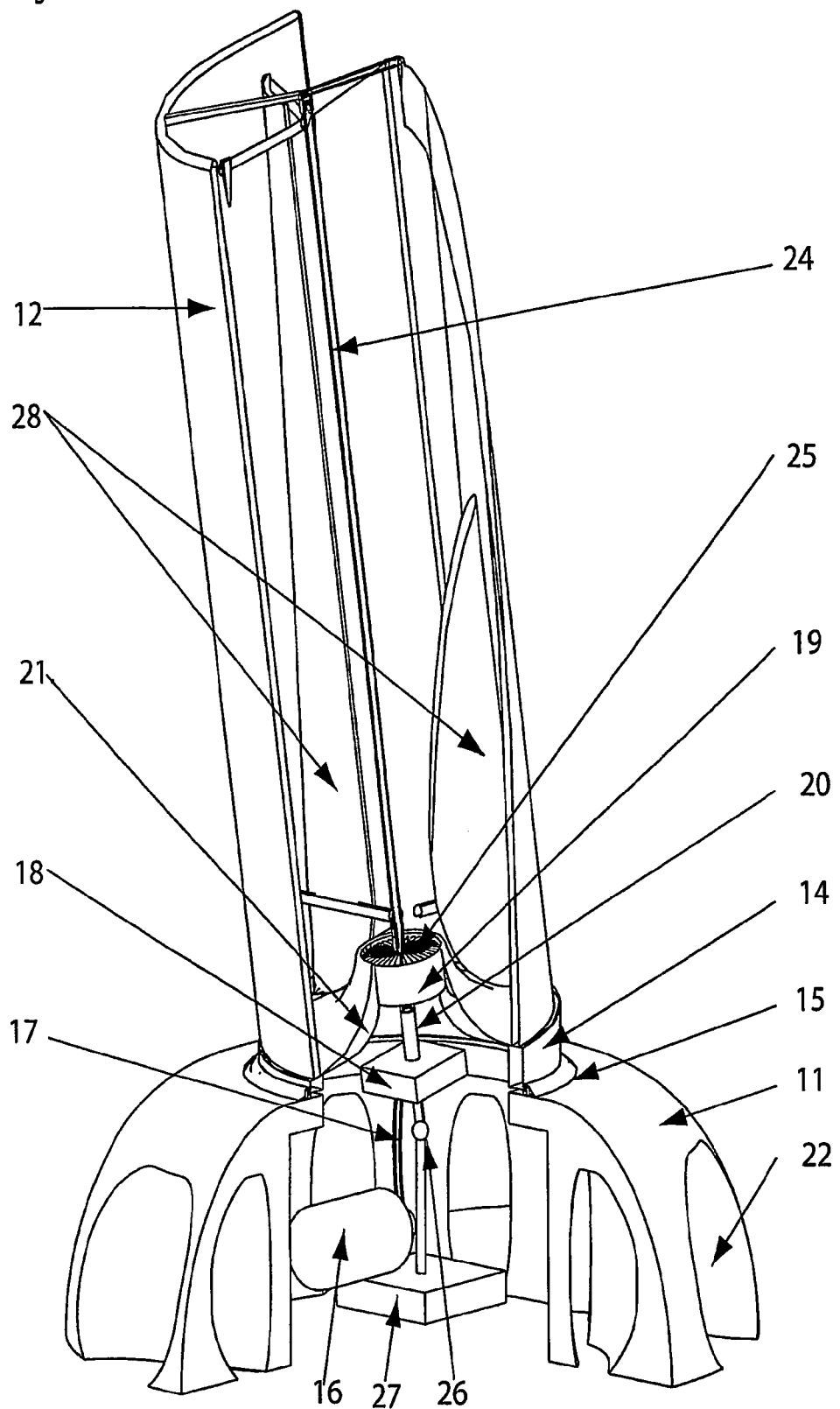
FIG. 1 is a schematic perspective view, partially cut up, of a wind power plant according to a first exemplary embodiment of the present invention.
Figure 3:
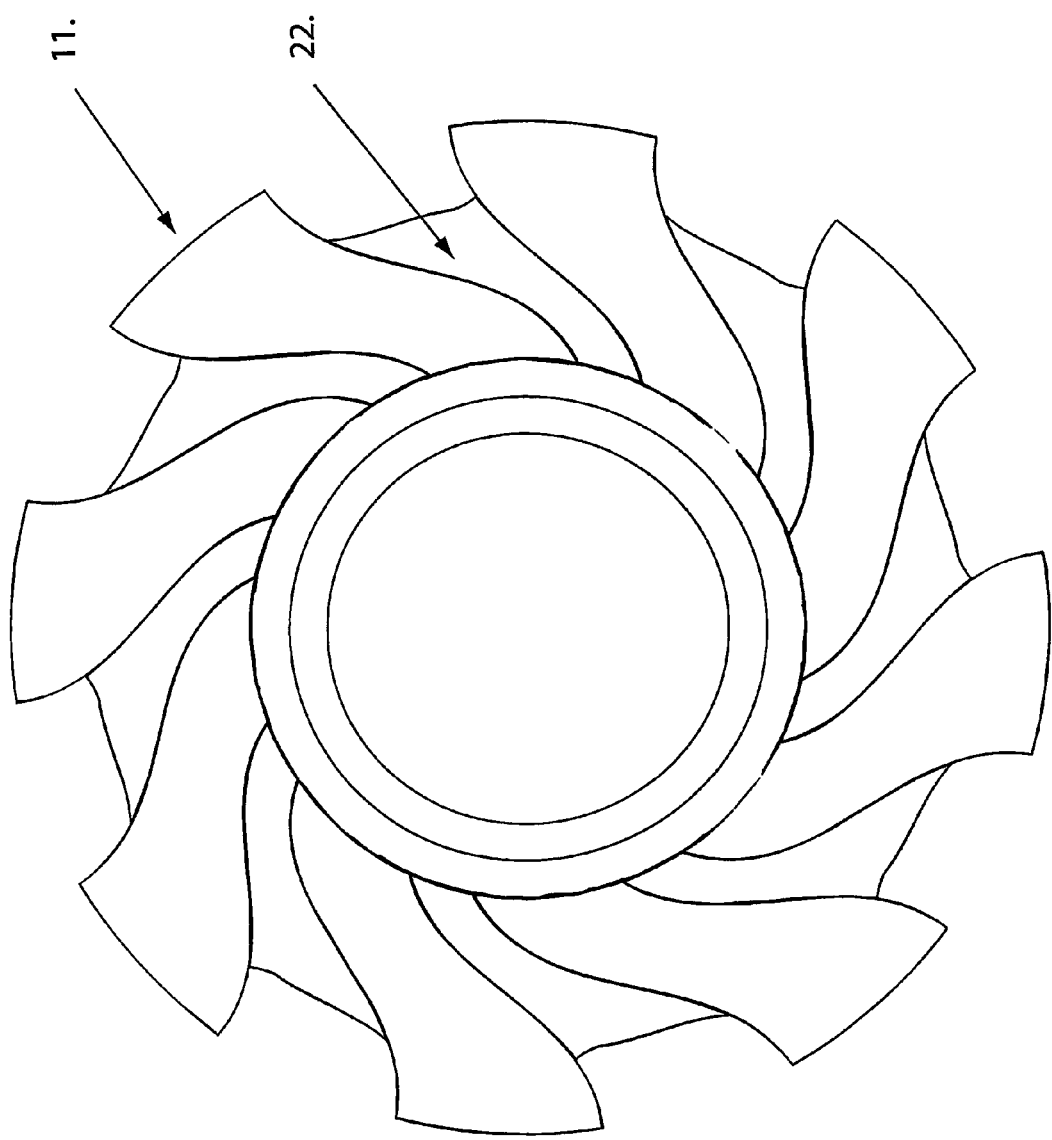
FIG. 3 is a view from below in FIG. 1.

In FIGS. 1-3, a wind power plant having a base 11 and a rotatable tower 12 mounted onto the base is shown. The tower 12 has a circular cross section (see B-B in FIG. 2a) and a wind inlet 13 as illustrated in FIG. 2b. The wind inlet extends along the entire height of the tower. The lower portion of the tower is provided with a wedge 14, which makes the tower lean away from the wind and this wedge is horizontally mounted in a bearing 15 in the upper portion of the base and the rotation of the tower is driven by a motor (not shown) and the control is automatic so that the wind inlet is always facing the wind. The tower is hence rotated around the vertical axis of the bearing 15.

Inside the base there is a generator 16 built together with a hydraulic motor, which is driven by a hydraulic pump 18 via hydraulic hoses 17. A substantially horizontal turbine 19 in the lower portion of the tower drives the hydraulic pump 18 via a hollow axle, a tubular shaft 20, which is parallel to and coaxial to the tower 12. The turbine 19 has a venturi-shaped inlet 21 to which a number of helical inlet ducts 22 are connected.

The tower has a rotor 23 coaxial to the tower and the turbine. It has a shaft 24 that is arranged through the tubular shaft 20 and is connected thereto by means of a freewheel coupling 25. The freewheel coupling is a standard machine element and therefore not shown in detail. The shaft 24 is provided with a universal joint 26 and is connected to a water brake 27, whereby the rotor 23 heats up the water in the water brake. The rotor 23 has three blades 28, which leave the center of the tower free, at least for a portion the size of the turbine 19, see e.g. FIG. 2b. Since the tower of the present exemplary embodiment leans, the blades 28 are inclined in such a manner that they are vertical in the position when they are hit by the wind. This inclining or curved design of the blades also results in that the rear side of the blade will contribute to, by helical action, directing air upwards and out of the tower as the blade rotates.

As the wind blows in through the wind inlet 13, the air will form a cyclone, the vortex ("eye") of which is positioned right before the outlet of the turbine 19. This is the region of the lowest pressure and the cyclone will therefore suck up air through the turbine whereby the turbine rotates. The air will then rise upwards spirally and escape from the top of the tower.

At low wind velocities, the formed cyclone will be so weak that the rotor 23 drives the turbine 19 via the freewheel coupling 25 between the shafts 24 and 20. At higher wind speeds, the rotor 23 will disturb the cyclone formation slightly but it yields gains at low wind speeds and the combination of cyclone formation and rotor 23 is a compromise shown to be favorable in many applications. Since the blades 28 of the rotor 23 only cover a minor portion of the tower radius and leave the center of the tower free, their implact is acceptable. However, in alternative embodiments it may be chosen to leave out the rotor 23 and instead use an empty tower.

The heat generated in the water brake 27 can for instance be used in a district heating network. The water brake can be electronically controlled from zero power and upward in order to provide the power plant with the desired total relationship between output heat energy and electric power at any instant.

As shown in FIGS. 2*b-c*, the tower 12 has a circular cross section, which means that the cross section from a horizontal point of view (FIG. 2*c*) is elliptical. This design has shown to considerably increase the output power of the wind power plant as compared to a design with a vertical tower having a circular cross section. This is probably due to the fact that the air flow in the formed cyclone will be retarded and accelerated twice per rotation, i.e. there will be four changes in velocity per rotation, which results in kinetic energy being transformed into heat energy. The increased air temperature decreases the air density and consequently increases the vertical rise velocity of the air in the cyclone and increases the power of the turbine. The diameter of the tower can for example be 10-15 m for a medium sized power plant and the tower height can for example be about 3 times the diameter.

In the above-described example, the elliptical tower shape in the horizontal plane is obtained through a tower with a circular cross section that leans with respect to the vertical. The leaning would typically be at an angle of 2-40 degrees and most preferred 10-30 degrees.

FIGS. 4*a-b* illustrate an alternative embodiment where the tower is vertically arranged and the non-circular elliptical shape in a horizontal cross section is achieved by designing the erect tower to be elliptical in itself, see the cut on line D-D in FIG. 4*a* shown in FIG. 4*b*. Also this tower is oriented such that the large axis of the ellipse is arranged to be parallel to the direction of the incoming wind.

In this alternative embodiment, there is no need to make the tower lean away from the wind and as such no need to incline the rotor blades 28. This embodiment is from a mechanical point of view more simple than the exemplary embodiments that were shown with reference to FIGS. 1 and 2. This erect embodiment of the present invention will not be described in further detail herein, since the tower 12 is mounted in a similar manner and it comprises components already described with reference to FIGS. 1 and 2.

The invention claimed is:

1. A method of obtaining energy from a wind power plant comprising a generator-driving turbine with an axis parallel to a tower, whereby a cyclone is generated in the tower open at the top and provided with a side inlet for the wind so that the low-pressure region in the center of the cyclone generates the driving force for the air flow through the turbine, the tower being rotated during operation such that the wind side inlet of the tower is maintained towards the wind, wherein the tower is maintained in a leaning position to the vertical in a direction parallel to the direction of the wind such that the cross-section of the tower forms an elliptical shape in the horizontal plane substantially along the entire tower length, the centre of the ellipse being positioned substantially at said axis.

2. The method according to claim 1, wherein the tower is maintained leaning at 10-30degrees to the vertical.

3. The method according to claim 1, wherein the tower is maintained leaning to the vertical in a direction coinciding with the direction of the wind.

4. The method according to claim 1, wherein the air is provided to a venturi-shaped inlet through a plurality of helical channels in a base of the wind power plant.

5. A wind power plant of cyclone type comprising a base, a tower arranged above the base and being open at the top and provided with a side inlet for the wind to generate a cyclone in the tower, a substantially horizontal turbine having inlets through the base and an outlet to the center of the cyclone in the tower and being connected for driving a generator arranged in the base, wherein the cross-section of the tower forms an elliptical shape in the horizontal plane substantially along the entire tower length, the centre of the ellipse being positioned at the tower axis.

6. The wind power plant according to claim 5, wherein said elliptical shape is formed by the tower having a circular cross section and leaning to the vertical in a direction parallel to the direction of the wind.

7. The wind power plant according to claim 6, wherein the tower is leaning at 10-30degrees to the vertical, in a direction coinciding with the direction of the wind.

8. The wind power plant according to claim 5, wherein the tower is vertical.

9. The wind power plant according to claim 5, wherein the tower comprises a rotor with blades and a shaft parallel and coaxial to the tower which is connected to a shaft of the turbine by means of a freewheel coupling.

10. The wind power plant according to claim 9, wherein the rotor shaft is arranged for driving a water brake for heating up water.

* * * * *